(12) United States Patent
Kunisa et al.

(10) Patent No.: US 10,310,508 B2
(45) Date of Patent: Jun. 4, 2019

(54) VEHICLE CONTROL APPARATUS

(71) Applicant: Toyota Jidosha Kabushiki Kaisha, Toyota-shi Aichi-ken (JP)

(72) Inventors: Akiomi Kunisa, Hirakata (JP); Toshiki Matsui, Shizuoka (JP); Yusuke Nemoto, Toyota (JP); Norihiro Takahashi, Shizuoka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/680,838

(22) Filed: Aug. 18, 2017

(65) Prior Publication Data

US 2018/0059674 A1    Mar. 1, 2018

(30) Foreign Application Priority Data

Aug. 25, 2016  (JP) ................................ 2016-164896

(51) Int. Cl.
| | |
|---|---|
| *G05D 1/02* | (2006.01) |
| *G05D 1/00* | (2006.01) |
| *B60W 50/08* | (2012.01) |
| *B60W 50/14* | (2012.01) |
| *B60W 30/14* | (2006.01) |
| *B60W 30/18* | (2012.01) |

(52) U.S. Cl.
CPC ......... *G05D 1/0223* (2013.01); *B60W 30/143* (2013.01); *B60W 30/18145* (2013.01); *B60W 50/082* (2013.01); *B60W 50/14* (2013.01); *G05D 1/0061* (2013.01); *G05D 1/0246* (2013.01); *G05D 1/0274* (2013.01); *B60W 2420/42* (2013.01); *B60W 2550/146* (2013.01); *G05D 2201/0213* (2013.01)

(58) Field of Classification Search
CPC .. G05D 1/0223; G05D 1/0061; G05D 1/0246; G05D 1/0274; G05D 2201/0213; B60W 30/00
USPC ......................................................... 701/28
See application file for complete search history.

(56) References Cited

U.S. PATENT DOCUMENTS

| | | | |
|---|---|---|---|
| 9,523,984 B1 * | 12/2016 | Herbach | .............. B62D 15/025 |
| 2008/0077283 A1 | 3/2008 | Ueyama et al. | |
| 2009/0271108 A1 | 10/2009 | Kobori et al. | |

(Continued)

FOREIGN PATENT DOCUMENTS

| | | | |
|---|---|---|---|
| JP | 4341649 B2 | 10/2009 | |
| JP | 4810405 B2 | 11/2011 | |

(Continued)

*Primary Examiner* — Muhammad Shafi
(74) *Attorney, Agent, or Firm* — Dinsmore & Shohl LLP

(57) ABSTRACT

To control a speed at a time of entering a curved road a vehicle to autonomously travel within a travelling lane even in a case where there is an error in an estimated longitudinal position of the vehicle.
A curve travel speed calculation unit 15b calculates a curve travel speed for a vehicle to autonomously travelling in a travelling lane based on a curve radius and an estimated error in longitudinal position. A speed planning unit 15c and a travel control unit 17 decelerate the vehicle M such that the speed of the vehicle M becomes the curve travel speed at the time of entering the curved road in front of the vehicle M in a case where the speed of the vehicle M is equal to or higher than the curve travel speed and the curve travel speed is equal to or higher than the reference speed.

2 Claims, 4 Drawing Sheets

(56) References Cited

U.S. PATENT DOCUMENTS

| | | | | |
|---|---|---|---|---|
| 2009/0319112 A1* | 12/2009 | Fregene | ................ | B60W 30/16 |
| | | | | 701/25 |
| 2014/0050362 A1* | 2/2014 | Park, II | .............. | G06K 9/00791 |
| | | | | 382/104 |
| 2016/0327947 A1 | 11/2016 | Ishikawa et al. | | |

FOREIGN PATENT DOCUMENTS

| JP | 4847852 B2 | 12/2011 |
|---|---|---|
| JP | 4944551 B2 | 6/2012 |
| JP | 2012-128781 A | 7/2012 |
| JP | 2014-034251 A | 2/2014 |
| JP | 2015-141611 A | 8/2015 |
| JP | 2015-178332 A | 10/2015 |
| JP | 2015-179037 A | 10/2015 |

\* cited by examiner

VEHICLE CONTROL APPARATUS

CROSS-REFERENCE TO RELATED APPLICATION

This application claims priority to Japanese Patent Application No. 2016-164896 filed on Aug. 25, 2016, the entire contents of which are hereby incorporated by reference.

TECHNICAL FIELD

The present disclosure relates to a vehicle control apparatus.

BACKGROUND

A vehicle control apparatus that performs a control of a vehicle is disclosed in, for example, Japanese Unexamined Patent Publication No. 2015-178332. The vehicle control apparatus disclosed in Japanese Unexamined Patent Publication No. 2015-178332 estimates a position of the vehicle based on detected lane lines, and causes the vehicle to autonomously travel based on the estimated position.

SUMMARY

Here, there is an error (a deviation) in the estimated position of the vehicle. An error in longitudinal position is an example of an error in longitudinal position of the vehicle. When this error in longitudinal position is large, in a case where the vehicle enters a curved road from a straight road, depending on a vehicle speed, it can be considered that the vehicle cannot autonomously travel within a travelling lane on the curved road.

Therefore, an aspect of the present disclosure has an object to provide a vehicle control apparatus that controls the vehicle speed at the time of entering the curved road such that the vehicle can autonomously travel within the travelling lane on the curved road even in a case where there is an error in the estimated longitudinal position of the vehicle.

An aspect of the present disclosure provides a vehicle control apparatus configured to cause a vehicle to autonomously travel and to include: a longitudinal position collation unit configured to recognize a longitudinal position which is a position of the vehicle in an extending direction of a travelling road in which the vehicle travels, based on image information from a camera and position information of a landmark on a map; a longitudinal position estimation unit configured to estimate the longitudinal position based on a result of detection by an internal sensor that detects a state of the vehicle and a result of recognition by the longitudinal position collation unit; an error estimation unit configured to estimate an error in longitudinal position estimated by the longitudinal position estimation unit, based on accuracy of detection by the internal sensor; a radius acquisition unit configured to acquire a curve radius of a curved road in front of the vehicle using the estimated longitudinal position and the map information; a curve travel speed calculation unit configured to calculate a curve travel speed for the vehicle to autonomously travelling in the travelling lane on the curved road having the acquired curve radius based on the acquired curve radius and the estimated error in longitudinal position; a speed control unit configured to decelerate the vehicle such that the vehicle speed becomes the curve travel speed at the time of entering the curved road in front of the vehicle in a case where the vehicle speed is equal to or higher than the curve travel speed and the curve travel speed is equal to or higher than a preset reference speed, and configured to decelerate the vehicle such that the current speed is maintained or the vehicle speed becomes the reference speed at the time of entering the curved road in front of the vehicle in a case where the vehicle speed is equal to or higher than the curve travel speed and the curve travel speed is lower than the reference speed; and a request unit configured to perform a hands-on request to switch the control of the vehicle to a manual driving by a driver in a case where the vehicle speed is equal to or higher than the curve travel speed and the curve travel speed is lower than the reference speed. The curve travel speed calculation unit is configured to make the curve travel speed be low in a case where the curve radius is short compared to a case where the curve radius is long, and configured to make the curve travel speed be low in a case where the error in longitudinal position is large compared to a case where the error in longitudinal position is small.

The curve travel speed calculation unit in this vehicle control apparatus is configured to make the curve travel speed be low in a case where the estimated error in longitudinal position is large compared to a case where the error in longitudinal position is small, and configured to make the curve travel speed be low in a case where the error in longitudinal position is large compared to a case where the error in longitudinal position is small. The speed control unit is configured to decelerate the vehicle down to the curve travel speed in a case where the vehicle speed is equal to or higher than the curve travel speed and the curve travel speed is equal to or higher than a preset reference speed. In this way, in a case where the error in longitudinal position is large, the vehicle speed becomes low compared to a case where the error is small. As described above, since the speed of the vehicle is controlled according to the error in longitudinal position, even in a case where there is an error in the estimated longitudinal position of the vehicle, it is possible to control the speed at the time of entering the curved road such that the vehicle can be caused to autonomously travel within the travelling lane on the curved road.

The vehicle control apparatus is configured to perform a hands-on request to switch the control of the vehicle to a manual driving by a driver in a case where the curve travel speed is lower than the preset reference speed. That is, when the vehicle control apparatus tries to control the travelling of the vehicle, the control is performed to make the speed be lower than the reference speed because the estimated error in longitudinal position is large. However, in this case, by switching the driving state to the manual driving by the driver, it is possible for the driver to drive the vehicle along the curved road at an appropriate speed. In this way, the vehicle travels at the speed lower than the reference speed, and thus, it is possible to suppress the interference with the travelling of a following vehicle. In addition, in a case where the curve travel speed is lower than the preset reference speed, by maintaining the speed of the vehicle, since the state of the vehicle does not change (the speed is constant) until the hands-on is performed, the driver can easily perform the hands-on. Alternatively, in a case where the curve travel speed is lower than the preset reference speed, by decelerating the vehicle down to the reference speed, the state of the vehicle slowly changes, and thus, the driver can easily perform the hands-on.

The request unit may be configured to calculate a reference distance which is a travel distance in a case of travelling during the reference time at the current speed of the vehicle based on the reference time preset as a time for switching the driving state of the vehicle to the manual driving state from the autonomous driving state and the current speed of the vehicle, and may be configured to perform the hands-on request at the position before the curved road in front of the vehicle as much as the reference distance. In this case, since the hands-on request is performed at the position before the vehicle entering the curved road as much as the reference distance, it is possible to secure the reference time preset as a time for the driver to perform the hands-on.

According to an aspect of the present disclosure, since the vehicle speed is controlled according to the error in longitudinal position, it is possible to control the speed at the time of entering the curved road such that the vehicle can autonomously travel within the travelling lane on the curved road even in a case where there is an error in the estimated longitudinal position of the vehicle.

DETAILED DESCRIPTION

Hereinafter, an embodiment of the present disclosure will be described with reference to the drawings. In the description of the drawings, the same reference signs will be given to the same elements and the descriptions thereof will not be repeated.

Figure 1:
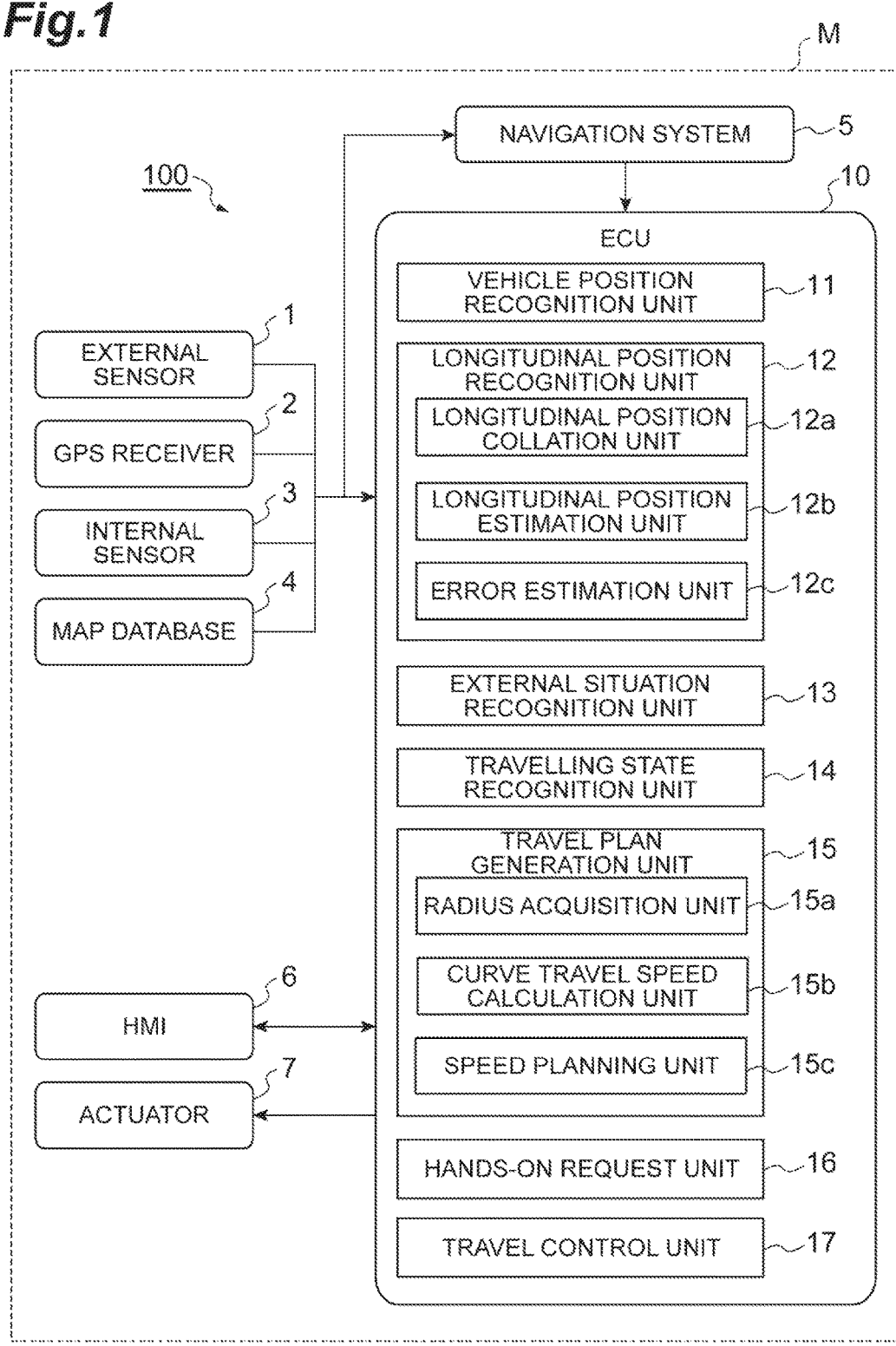
FIG. 1 is a diagram illustrating a schematic configuration of a vehicle control apparatus in an embodiment.

As illustrated in FIG. 1, a vehicle control apparatus 100 is mounted on a vehicle M such as a passenger car and performs a control (an autonomous driving control) such that the vehicle M autonomously travels, on which the vehicle control apparatus 100 is mounted. The vehicle control apparatus 100 includes an external sensor 1, a global positioning system (GPS) receiver 2, an internal sensor 3, a map database 4, a navigation system 5, an HMI 6, an actuator 7, and an electronic control unit (ECU) 10.

The external sensor 1 is a detection device that detects a situation around the vehicle M. The external sensor 1 includes a camera and a radar sensor.

The camera is an imaging device that images external situations of the vehicle M. The camera is provided on the inside of windshield of the vehicle M. The camera transmits image information relating to the external situations of the vehicle M to the ECU 10. The camera may be a monocular camera or may be a stereo camera. The stereo camera has two imaging units that are arranged so as to reproduce a binocular parallax. The image information from the stereo camera includes information in the depth direction.

The radar sensor detects an obstacle around the vehicle M using a radio wave (for example, a millimeter wave) or light. The radar sensor detects the obstacle by transmitting the radio wave or the light to the surroundings of the vehicle M and receiving the radio wave or the light reflected from the obstacle. The radar sensor transmits the detected obstacle information to the ECU 10. The obstacles include fixed obstacles such as guardrails and buildings, and moving obstacles such as pedestrians, bicycles, and other vehicles.

The GPS receiver 2 receives signals from three or more GPS satellites and measures the position of the vehicle M (for example, the latitude and longitude of the vehicle M). The GPS receiver 2 transmits the measured position information of the vehicle M to the ECU 10.

The internal sensor 3 is a detection device that detects a travelling state (a state of the vehicle) of a vehicle M. The internal sensor 3 includes a vehicle speed sensor, an acceleration sensor, and a yaw rate sensor. The vehicle speed sensor is a detection device that detects a speed of the vehicle M. As the vehicle speed sensor, a wheel speed sensor is used, which is provided on vehicle wheels of the vehicle M or a drive shaft rotating integrally with the vehicle wheels, and detects a rotational speed of the vehicle wheels. The vehicle speed sensor transmits the detected vehicle speed information to the ECU 10.

The acceleration sensor is a detection device that detects an acceleration of the vehicle M. The acceleration sensor includes a longitudinal acceleration sensor that detects acceleration in the longitudinal direction of the vehicle M and a lateral acceleration sensor that detects a lateral acceleration of the vehicle M. The acceleration sensor transmits acceleration information of the vehicle M to the ECU 10. The yaw rate sensor is a detection device that detects a yaw rate around the vertical axis of the center of gravity of the vehicle M (rotational angular velocity). As the yaw rate sensor, for example, a gyro sensor can be used. The yaw rate sensor transmits the detected yaw rate information of the vehicle M to the ECU 10.

The map database 4 is a database in which map information is stored. The map database 4 is formed, for example, in a hard disk drive (HDD) mounted on the vehicle M. The map information includes position information of roads, information of road types (for example, types of roads such as straight roads, curved roads, and a curve radius), position information of lane lines, position information of intersections and branch points, and position information of buildings. The map database 4 may be stored in a computer in a facility such as a management center which is capable of communicating with the vehicle M.

In addition, landmark information is also stored in the map database 4. A landmark is an object the position of which is fixed on the road surface (including the road surface other than a vehicle traffic zone) and which becomes a reference for calculating the position of an object. Road signs and road markings are included in the landmark. The road signs include information signs, warning signs, regulatory signs, and instruction signs. The road markings include regulatory markings and instruction markings. The regulatory markings include a turning prohibition mark and a maximum speed mark. The instruction markings include lane lines (for example, a roadway center line, roadway outside lines, and lane boundary lines), a diamond mark indicating that there is a pedestrian crosswalk ahead, a triangle mark indicating that there is a priority road ahead, a travelling direction mark, a traffic signal, a denilator, and entrance and exit to and from a tunnel, and an entrance and exit to and from an ETC gate.

Furthermore, the map database 4 stores position information of the landmarks on the map. That is, the map database 4 stores the position information of the landmarks associated with the map information. In addition, in some cases, the map database 4 stores landmark image information for recognizing the landmarks from the image information by the camera in the external sensor 1.

The navigation system 5 is a device that performs guidance to a destination set by a driver of the vehicle M for the driver of the vehicle M. The navigation system 5 calculates a travel route of the vehicle M based on the position information of the vehicle M measured by the GPS receiver 2 and the map information in the map database 4. The route may be a route on which a preferable lane is specified in a road section of multi-lane. The navigation system 5 calculates, for example, a target route from the position of the vehicle M to the destination and notifies the driver of the target route by displaying on a display or a voice output through a speaker. The navigation system 5, for example, transmits the target route information of the vehicle M to the ECU 10. The navigation system 5 may be stored in a computer in a facility such as an information processing center which is capable of communicating with the vehicle M.

The HMI 6 is an interface for performing an input and output of information between occupants (including the driver) and the vehicle control apparatus 100. The HMI 6 includes, for example, a display panel for displaying the image information for the occupants, a speaker for an audio output, and an operation button or a touch panel for the occupants to perform the input operation. When an input operation for starting or stopping the autonomous driving is performed by the occupant, the HMI 6 outputs a signal to the ECU 10, and starts or stops the autonomous driving. In a case where the vehicle arrives at the destination where the autonomous driving ends, the HMI 6 notifies the occupants of the arrival at the destination.

The actuator 7 is a device that executes a travel control of the vehicle M. The actuator 7 includes at least an engine actuator, a brake actuator, and a steering actuator. The engine actuator changes a supply amount (for example, a throttle opening degree) of air to an engine according to a control signal from the ECU 10, and controls the driving power of the vehicle M. In a case where the vehicle M is a hybrid vehicle or an electric vehicle, the engine actuator controls the driving power of a motor as a source of the driving power.

The brake actuator controls a brake system according to the control signal from the ECU 10 and controls the braking power given to the wheels of the vehicle M. For example, a hydraulic brake system can be used as the brake system. In a case where the vehicle M is equipped with a regenerative braking system, the brake actuator may control both the hydraulic brake system and the regenerative braking system. The steering actuator controls the driving of an assist motor that controls a steering torque in the electric power steering system according to the control signal from the ECU 10. In this way, the steering actuator controls the steering torque of the vehicle M.

The ECU 10 controls the travelling of the vehicle M. The ECU 10 is an electronic control unit including a central processing unit (CPU), a read only memory (ROM), a random access memory (RAM), and a controller area network (CAN) communication circuit. The ECU 10 realizes various functions by loading a program stored in the ROM on the RAM, and executing the program loaded on the RAM using the CPU. The ECU 10 may be configured to include a plurality of electronic control units. In addition, a part of the functions of the ECU described below may be executed by a computer in a facility such as an information management center which is capable of communicating with the vehicle or a mobile information terminal.

Functionally, the ECU 10 includes a vehicle position recognition unit 11, a longitudinal position recognition unit 12, an external situation recognition unit 13, a travelling state recognition unit 14, a travel plan generation unit 15, a hands-on request unit (request unit) 16, and a travel control unit 17.

The vehicle position recognition unit 11 recognizes a position of the vehicle M on the map based on the position information of the vehicle M received from the GPS receiver 2 and the map information in the map database 4. The vehicle position recognition unit 11 may acquire and recognize the position of the vehicle M used in the navigation system 5 from the navigation system 5.

The longitudinal position recognition unit 12 recognizes the longitudinal position of the vehicle M based on the landmark imaged by the camera in the external sensor 1. The longitudinal position of the vehicle M is a position of the vehicle M in the extending direction of the travelling road on which the vehicle M travels. Specifically, the longitudinal position recognition unit 12 includes a longitudinal position collation unit 12a, a longitudinal position estimation unit 12b, and an error estimation unit 12c.

The longitudinal position collation unit 12a collates the image information from the camera in the external sensor 1 with the position information of the landmark on the map stored in the map database 4, and then, recognizes the longitudinal position of the vehicle M. Specifically, the longitudinal position collation unit 12a acquires the information on the landmark around the vehicle M from the map database 4 based on the position of the vehicle recognized by the vehicle position recognition unit 11. After the longitudinal position is estimated by the longitudinal position estimation unit 12b as described below, the longitudinal position collation unit 12a can acquire the information on the landmark around the vehicle M from the map database 4 based on the longitudinal position estimated by the longitudinal position estimation unit 12b.

The longitudinal position collation unit 12a recognizes the landmark included in a captured image based on an image captured by the camera in the external sensor 1 and the information on the landmark acquired from the map database 4. The longitudinal position collation unit 12a recognizes the landmark in the image by, for example, pattern recognition or an edge extraction. In a case where the landmark included in the captured image is recognized, the longitudinal position collation unit 12a recognizes image position coordinates of the landmark in the captured image using known image processing. The image position coordinates of the landmark is coordinates of the position of the landmark image in the captured image. For example, the image position coordinates of a diamond mark which is a road marking on a road surface can be designated as the coordinates of the center of the diamond mark in the captured image. The longitudinal position collation unit 12a recognizes the image position coordinates of the landmark using a known method.

In a case where the image position coordinates of the landmark is recognized, the longitudinal position collation unit 12a recognizes the longitudinal position of the vehicle M based on the image position coordinates of the landmark in the captured image and the position information of the landmark on the map. The longitudinal position collation unit 12a performs the landmark-used recognition of the longitudinal position of the vehicle M using a known method.

The longitudinal position estimation unit 12b estimates the longitudinal position of the vehicle M based on the result of detection by the internal sensor 3 and the result of recognition (the longitudinal position of the vehicle M) by the longitudinal position collation unit 12a. Here, in a case where the landmark cannot be detected (in a case where there is no landmark), the longitudinal position collation unit 12a cannot recognize the longitudinal position of the vehicle M. Therefore, after the longitudinal position of the vehicle M is recognized by the longitudinal position collation unit 12a, the longitudinal position estimation unit 12b estimates the longitudinal position of the vehicle M, using the recognized longitudinal position as a reference, based on the referenced longitudinal position and the result of detection by the internal sensor 3. In a case where a longitudinal position is newly recognized by the longitudinal position collation unit 12a during the estimation of the longitudinal position, the longitudinal position estimation unit 12b performs the estimation of the longitudinal position again, using the longitudinal position newly recognized by the longitudinal position collation unit 12a as a new reference, based on the newly referred longitudinal position and the result of detection by the internal sensor 3.

As an example, the longitudinal position estimation unit 12b can use the speed of the vehicle M detected by the vehicle speed sensor and the yaw rate of the vehicle M detected by the yaw rate sensor as the result of detection by the internal sensor 3. For example, in a case of using the speed detected by the vehicle speed sensor, the longitudinal position estimation unit 12b estimates a travel distance based on the detected speed, and can perform the estimation of the longitudinal position based on the estimated travel distance. In addition, in a case of using the yaw rate detected by the yaw rate sensor, the longitudinal position estimation unit 12b estimates a direction of the vehicle M based on the detected yaw rate, and can perform the estimation of the longitudinal position based on the estimated direction of the vehicle M. The estimation of the longitudinal position using the result of detection by the internal sensor 3 can be performed using various existing methods.

The error estimation unit 12c estimates an error in longitudinal position estimated by the longitudinal position estimation unit 12b, based on accuracy of detection by the internal sensor 3 used in the estimation of the longitudinal position by the longitudinal position estimation unit 12b. The error in longitudinal position is a deviation between the longitudinal position estimated by the longitudinal position estimation unit 12b and an actual longitudinal position of the vehicle M. In a case where the accuracy of detection by the internal sensor 3 used in the estimation of the longitudinal position is low, the error estimation unit 12c makes the value of the error be large (the error is large) compared to a case where the accuracy of detection is high. In addition, in a case where the estimation of the longitudinal position is performed by the longitudinal position estimation unit 12b, the error in longitudinal position estimated by the longitudinal position estimation unit 12b becomes large as the time elapses. Therefore, in a case where the elapsed time from the time when the longitudinal position used as the reference for estimating the longitudinal position is recognized by the longitudinal position collation unit 12a is long, the error estimation unit 12c makes the value of the error be large (the error is large) compared to a case where the elapsed time is short.

In a case where the longitudinal position of the vehicle M is recognized by the longitudinal position collation unit 12a, the error estimation unit 12c resets the estimated error in longitudinal position (makes the error to zero). After the error is reset, the error estimation unit 12c newly performs the estimation of the error in longitudinal position.

The external situation recognition unit 13 recognizes the external situations of the vehicle M based on the result of detection (for example, the image information from the camera, the obstacle information from the radar sensor, or the like) by the external sensor 1. The external situations include, for example, positions of lane lines of the travelling lane with respect to the vehicle M or a position of the center of the lane and a road width, a road shape (for example, a curvature of the travelling lane, a change of slope of the road surface effective for estimating the outlook of the external sensor 1, and undulation), an obstacle situation around the vehicle M (for example, information for distinguishing the fixed obstacle and the moving obstacle, a position of the obstacle with respect to the vehicle M, a moving direction of the obstacle with respect to the vehicle M, and a relative speed of the obstacle with respect to the vehicle M).

The travelling state recognition unit 14 recognizes the travelling state of the vehicle M based on the result of detection by the internal sensor 3 (for example, the vehicle speed information from the vehicle speed sensor, the acceleration information from the acceleration sensor, and the yaw rate information from the yaw rate sensor). The travelling state of the vehicle M includes, for example, the vehicle speed, the acceleration, and the yaw rate.

The travel plan generation unit 15 generates a travel plan of the vehicle M based on the target route set by the navigation system 5, the map information from the map database 4, the external situations of the vehicle M recognized by the external situation recognition unit 13, and the travelling state of the vehicle M recognized by the travelling state recognition unit 14. In a case where the driver performs an operation for starting the autonomous driving control, the travel plan generation unit 15 starts the generation of the travel plan. This travel plan is a travel plan from the current position of the vehicle M to a preset destination where the vehicle M reaches.

A control target value of the vehicle M corresponding to the position on the target route of the vehicle M is included in the travel plan. The position on the target route is a position in the extending direction of the target route on the map. The position on the target route means a set longitudinal position set for every predetermined interval (for example, 1 m) in the extending direction of the target route. The control target value is a value of the control target of the vehicle M in the travel plan. The control target value is set in association with every set longitudinal position on the target route. The travel plan generation unit 15 sets the set longitudinal position on the target route at the predetermined interval and sets the control target value (for example, a target lateral position and a target vehicle speed) for every set longitudinal position, and then generates the travel plan. The set longitudinal position and the target lateral position may be set together as one position coordinates. The set longitudinal position and the target lateral position mean information on the longitudinal position and information on the lateral position set as a target in the travel plan.

In addition, in a case where a curved road is present in front of the vehicle M, the travel plan generation unit 15 in the present embodiment performs a speed planning to decelerate the vehicle M as a plan of speed in the travel plan based on the error in longitudinal position estimated by the error estimation unit 12c such that the vehicle M autonomously travels (autonomous driving control) on the curved road. Hereinafter, the speed plan generation processing to decelerate the vehicle M in a case where the curved road is present in front of the vehicle M will be described.

Figure 2:
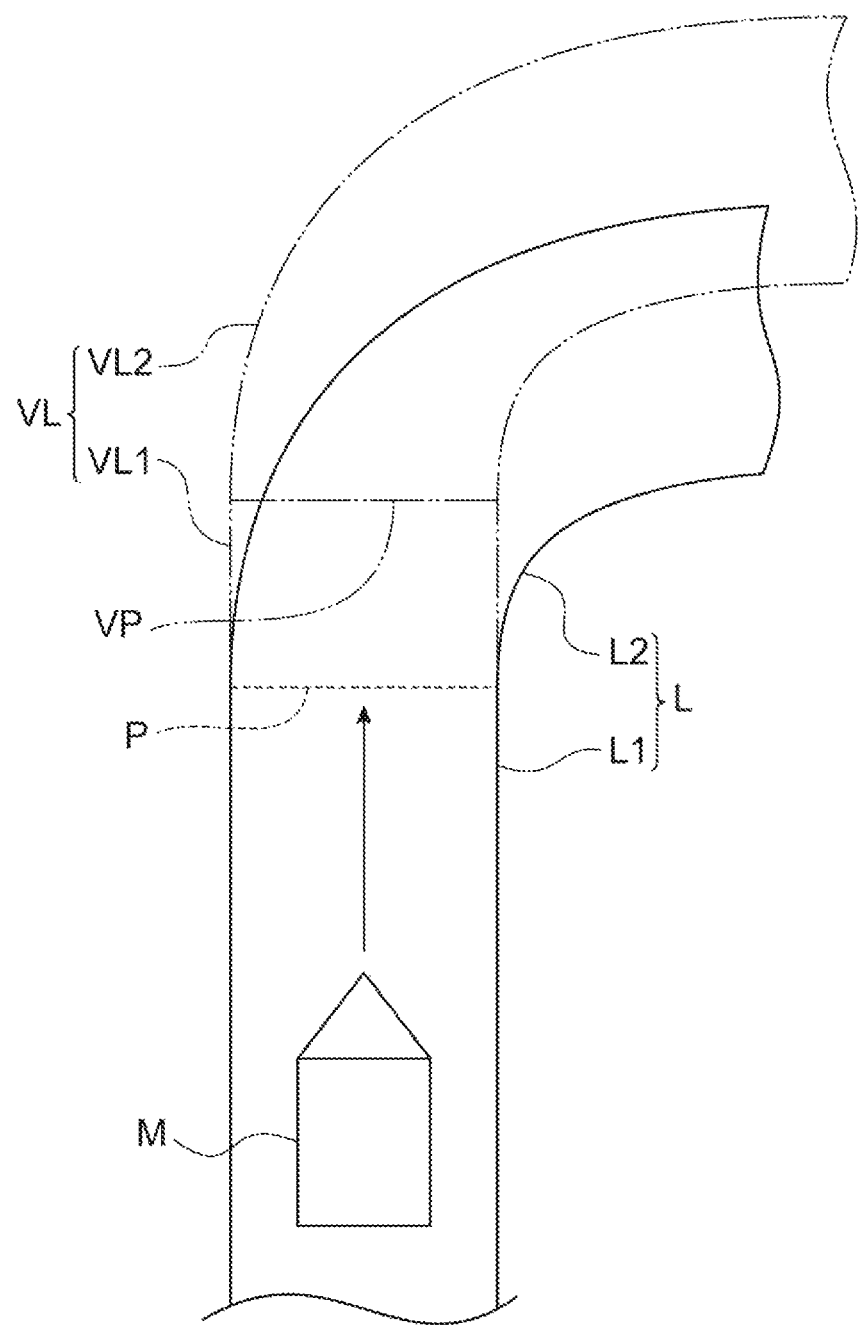
FIG. 2 is a schematic diagram illustrating a state in which a vehicle is travelling in a travelling lane in which there is a straight road ahead.

First, the error in longitudinal position will be described. For example, as illustrated in FIG. 2, it is assumed that the vehicle M is travelling in a travelling lane L. Currently, the vehicle M is travelling on a straight road L1 in the travelling lane L, and a curved road L2 is connected to the end of the straight road L1. A travelling lane VL illustrated in two-dot chain lines is a travelling lane recognized based on the longitudinal position including the error, estimated by the longitudinal position estimation unit 12b and the map information from the map database 4. In the example illustrated in FIG. 2, the longitudinal position of the vehicle M estimated by the longitudinal position estimation unit 12b is deviated rearward from the actual longitudinal position. Therefore, a position of the travelling lane VL with respect to the vehicle M is recognized to be deviated forward from the actual travelling lane L.

For example, in a case of causing the vehicle M to autonomously travel based on the longitudinal position having the rearward deviated error as illustrated in FIG. 2, the steering start timing for travelling along the curved road L2 is delayed, and thus, depending on the speed of the vehicle M, there is a case where the vehicle M cannot travel along the curved road L2 from the actual travelling lane L. Therefore, the travel plan generation unit 15 generates the plan to decelerate the vehicle M according to the error in longitudinal position such that the speed of the vehicle M is decreased to a speed at which the vehicle M can travel on the curved road when entering the curved road.

Here, "when entering the curved road" is a time point when the vehicle M passes through a point where the straight road is changed to the curved road. In addition, "when entering the curved road" is a time point when the vehicle M enters the curved road recognized based on the longitudinal position estimated by the longitudinal position estimation unit 12b and the map information from the map database 4. As illustrated in FIG. 2, it is assumed that a point where a straight road VL1 of the travelling lane VL is changed to a curved road VL2 of the travelling lane VL is a point VP. The point where the straight road is changed to the curved road "when entering the curved road" is the point VP in FIG. 2. In addition, as illustrated in FIG. 2, it is assumed that a point where the actual straight road L1 is changed to the curved road L2 is a point P. In the example illustrated in FIG. 2, the position of the point VP with respect to the vehicle M is deviated forward from the point P.

In order to generate the speed plan for decelerating the vehicle M in a case where the curved road is present in front of the vehicle M, the travel plan generation unit 15 includes a radius acquisition unit 15a, a curve travel speed calculation unit 15b, and a speed planning unit 15c. The radius acquisition unit 15a acquires a curve radius of the curved road in front of the vehicle M from the longitudinal position of the vehicle M estimated by the longitudinal position estimation unit 12b and the map information from the map database 4. The front of the vehicle M means the front of the vehicle M along the travelling lane of the vehicle M.

For example, in a case where the vehicle M is travelling on the straight road, the radius acquisition unit 15a acquires the curve radius of the curved road being present on the nearest position in front of the vehicle M. In a case where the vehicle M is travelling on the curved road, the radius acquisition unit 15a acquires the curve radius of the curved road being present on the nearest position in front of the vehicle M from the straight road connected to the front of the currently travelling curved road in front of the vehicle M. The radius acquisition unit 15a acquires the curve radius of the curved road in front of the vehicle M being present within a predetermined distance from the current longitudinal position of the vehicle M.

The curve travel speed calculation unit 15b calculates the curve travel speed for the vehicle M to autonomously travel within the travelling lane on the curved road having the acquired curve radius based on the curve radius acquired by the radius acquisition unit 15a and the error in longitudinal position estimated by the error estimation unit 12c. The curve travel speed is an upper limit value of the speed for the vehicle M to autonomously travel within the travelling lane on the curved road having the acquired curve radius while satisfying a predetermined criterion relating to the travel state using the autonomous driving control by the vehicle control apparatus 100. For example, the curve travel speed is a speed at which the vehicle M can travel without causing a lateral G equal to or greater than a predetermined value during the travelling on the curved road. In addition, the curve travel speed is a speed at which the vehicle M can travel without causing a slip or the like. In a case where the speed of the vehicle M is equal to the curve travel speed when entering the curved road, the vehicle M can travel within the travelling lane on the curved road using the autonomous driving control.

The curve travel speed calculation unit 15b decreases the curve travel speed in accordance with the decrease of the curve radius of the curved road (the curve is sharp). In a case where the curve radius of the curved road is decreased (the curve is sharp), an amount of steering necessary for travelling on the curved road becomes large, and the steering error increases. Here, in a case where the speed of the vehicle M is decreased, the steering error decreases because a tire slipping or the like is suppressed. Therefore, in a situation in which the steering error increases by performing the large amount of steering due to the short curve radius of the curved road, the curve travel speed calculation unit 15b decreases the curve travel speed for travelling on the curved road. As described above, by the curve travel speed calculation unit 15b decreasing the curve travel speed, the steering error based on the curve radius of the curved road and the vehicle speed is decreased, and thus, it is possible for the vehicle M to travel within the travelling lane on the curved road.

The curve travel speed calculation unit 15b decreases the curve travel speed in accordance with the increase of the error in longitudinal position estimated by the error estimation unit 12c. In a case where the error in longitudinal position is large, basically, the error in position recognition of the curved road increases. If the steering error caused by the speed of the vehicle M is further added to this error in position recognition of the curved road, the error in position of the vehicle M with respect to the actual travelling lane is further increased. Therefore, in order to suppress the increase of the error in position of the vehicle M with respect to the actual travelling lane, the curve travel speed calculation unit 15b decreases the curve travel speed for travelling on the curved road. As described above, by the curve travel speed calculation unit 15b decreasing the curve travel speed, the steering error caused by the speed of the vehicle M is decreased, and the increase of the error in position of the vehicle M with respect to the actual travelling lane is suppressed, and thus, the vehicle M can travel within the travelling lane on the curved road.

Figure 3:
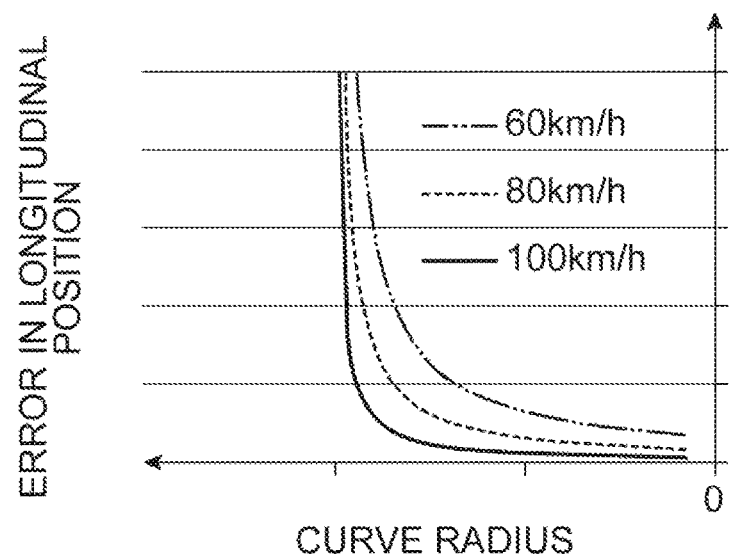
FIG. 3 is a graph illustrating an example of a relationship between a curve travel speed for the vehicle to autonomously travel within the travelling lane on a curved road, and a curve radius and an error in longitudinal position.

FIG. 3 is a graph illustrating an example of a relationship between the curve travel speed for the vehicle to autonomously travel within the travelling lane on the curved road, and the curve radius and the error in the longitudinal position. In the graph in FIG. 3, the horizontal axis represents the curve radius and the curve radius becomes small as it goes to the right side (the curve becomes sharp). The vertical axis represents the estimated error in longitudinal position of the vehicle M and the value of the error becomes large as it goes to the upper side. A solid line represents a case where the curve travel speed is 100 km/h, a dashed line represents a case where the curve travel speed is 80 km/h, and a two-dot chain line represents a case where the curve travel speed is 60 km/h.

For example, in a case where the errors in longitudinal position are the same, the curve travel speed decreases in accordance with the decrease of the curve radius. In addition, in a case where the curve radii are the same, the curve travel speed decreases in accordance with the increase of the error in longitudinal position.

The curve travel speed calculation unit 15b may calculate the curve travel speed using a map based on the curve radius and the error in longitudinal position or may calculate the curve travel speed using an arithmetic operation.

The curve travel speed is assumed to be a speed for the vehicle M to autonomously travel within the travelling lane. However, the curve travel speed may be a speed for the vehicle M to autonomously travel within a range in which a predetermined margin is taken toward the inside of the travelling lane from the lane line which is a boundary of the travelling lane.

The speed planning unit 15c performs a speed planning among the travel plans of the vehicle M. The speed planning unit 15c performs the speed planning of decelerating the vehicle M such that the speed of the vehicle M becomes the curve travel speed at the time of entering the curved road in front of the vehicle M in a case where the speed of the vehicle M is equal to or higher than the curve travel speed calculated by the curve travel speed calculation unit 15b and the curve travel speed is equal to or higher than a preset reference speed. In this way, it is possible to make the speed of the vehicle M at the time of entering the curved road as the curve travel speed at which the vehicle M can autonomously travel on the curved road.

The "speed of the vehicle M" compared here with the curve travel speed may be the current target vehicle speed in the above-described travel plan generated by the travel plan generation unit 15 without using the error in longitudinal position and the curve travel speed of the vehicle M. In addition, the "speed of the vehicle M" compared with the curve travel speed may be the current speed of the vehicle M detected by the vehicle speed sensor in the internal sensor 3.

In addition, the "reference speed" here is a speed that does not interfere with the travelling of a vehicle around the vehicle M in a case where the vehicle M travels on the curved road in front of the vehicle M. For example, the reference speed can be set as a legal speed of the road on which the vehicle M travels or a speed obtained by subtracting a predetermined value from the legal speed.

In addition, the speed planning unit 15c performs is the speed planning of decelerating the vehicle M such that the current speed is maintained or the speed of the vehicle M becomes the reference speed at the time of entering the curved road in front of the vehicle M in a case where the speed of the vehicle M is equal to higher than the curve travel speed and the curve travel speed is lower than the reference speed. The "speed of the vehicle M" and the "reference speed" compared here with the curve travel speed are the same with the "speed of the vehicle M" and the "reference speed" compared with the curve travel speed described above.

That is, the speed planning unit 15c performs the speed planning of decelerating the vehicle M such that the current speed is maintained or the speed of the vehicle M becomes the reference speed at the time of entering the curved road in a case where the speed of the vehicle M is higher than the reference speed. In addition, the speed planning unit 15c performs the speed planning of maintaining the current speed in a case where the speed of the vehicle M is equal to or lower than the reference speed. The "current speed" here may be the current target vehicle speed in the above-described travel plan generated by the travel plan generation unit 15 without using the error in longitudinal position and curve travel speed of the vehicle M. In addition, the "current speed" may be the current speed of the vehicle M detected by the vehicle speed sensor in the internal sensor 3. As described above, in a case where the speed of the vehicle M is higher than the reference speed, the speed of the vehicle M at the time of entering the curved road does not become lower than the reference speed. In addition, in a case where the speed of the vehicle M is lower than the reference speed, since the current speed of the vehicle M is maintained, the speed of the vehicle M does not become lower than the current speed.

In a case where the speed of the vehicle M is equal to or higher than the curve travel speed calculated by the curve travel speed calculation unit 15b and the curve travel speed is lower than the reference speed, the hands-on request unit 16 performs the hands-on request to switch the control of the vehicle M to a manual driving by the driver. The "speed of the vehicle M" compared here with the curve travel speed is the same as the "speed of the vehicle M" compared with the curve travel speed described above. The hands-on request is a request to switch the driving of the vehicle M from the state in which the autonomous driving of the vehicle M is performed by the vehicle control apparatus 100 to the manual driving by the driver. The hands-on request unit 16 performs the hands-on request using, for example, a display panel or a speaker provided in the HMI 6.

In addition, the hands-on request unit 16 performs the hands-on request at the position before the curved road in front of the vehicle M as much as the reference distance. The position before the curved road in front of the vehicle M as much as the reference distance means a position at the vehicle M side separated as much as the reference distance from the position of entering the curved road in front of the vehicle M. In addition, the reference distance is a travel distance in a case of travelling during the reference time at the current speed of the vehicle M based on the preset reference time and the current speed of the vehicle M. The "current speed" here is the speed of the vehicle M when it is determined that the hands-on request is performed. In addition, the "current speed" may be the current target vehicle speed in the above-described travel plan generated by the travel plan generation unit 15 without using the error in longitudinal position and the curve travel speed of the vehicle M. In addition, the "current speed" may be the current speed of the vehicle M detected by the vehicle speed sensor in the internal sensor 3. In addition, the preset "reference time" is a time preset as a time necessary for switching the driving state of the vehicle M from the autonomous driving state by the vehicle control apparatus 100 to the manual driving state by the driver.

The travel control unit 17 autonomously controls the travelling of the vehicle M based on the travel plan generated by the travel plan generation unit 15. In addition, in a case where the curved road is present in front of the vehicle M and the speed plan is generated by the speed planning unit 15c, the travel control unit 17 controls the travelling of the vehicle M based on the speed plan generated by the speed planning unit 15c as the speed plan among the travel plans. The travel control unit 17 outputs a control signal corresponding to the travel plan to the actuator 7. In this way, the travel control unit 17 controls the travelling of the vehicle M such that the vehicle M autonomously travels along the travel plan.

That is, the speed planning unit 15c that performs the speed planning and the travel control unit 17 that controls the speed of the vehicle M based on the generated speed plan function as speed control units that decelerate the vehicle M such that the speed of the vehicle M becomes the curve travel speed at the time of entering the curved road in front of the vehicle M in a case where the speed of the vehicle M is equal to or higher than the curve travel speed and the curve travel speed is equal to or higher than the preset reference speed, and decelerate the vehicle M such that the current vehicle speed is maintained or the speed becomes the reference speed at the time of entering the curved road in front of the vehicle M in a case where the speed of the vehicle M is equal to or higher than the curve travel speed and the curve travel speed is lower than the reference speed.

Figure 4:
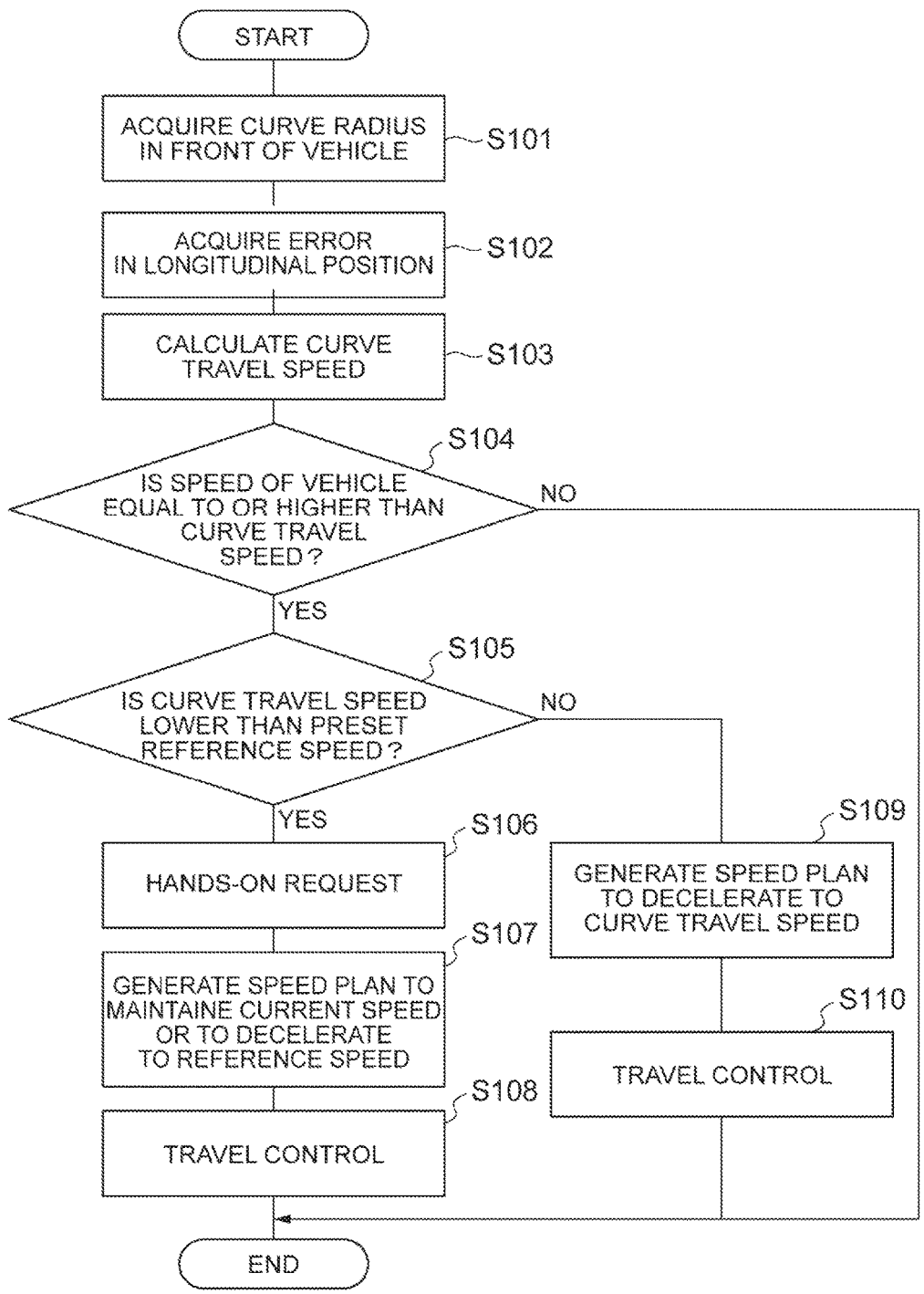
FIG. 4 is a flowchart illustrating a flow of processing for generating a speed plan to decelerate the vehicle in a case where a curved road is present in front of the vehicle.

Next, the flow of processing performed by the ECU 10 for generating the speed plan to decelerate the vehicle M in a case where the curved road is present in front of the vehicle M will be described. The processing illustrated in FIG. 4 is started in a state in which the autonomous driving control of the vehicle M is performed by the vehicle control apparatus 100 and in a case where a curved road is present within a predetermined distance in front of the vehicle M from the current longitudinal position of the vehicle M. After the processing illustrated in FIG. 4 reaches to an end, the processing is started again in a case where a curved road is present in further front of the curved road targeted for the current processing. The determination whether or not the curved road is present in front of the vehicle M can be performed by the radius acquisition unit 15a.

In a case where the curved road is present in front of the vehicle M, the radius acquisition unit 15a acquires the curve radius of the curved road in front of the vehicle M from the estimated longitudinal position of the vehicle M and the map information in the map database 4 (S101). The curve travel speed calculation unit 15b acquires the error in longitudinal position of the vehicle M estimated by the error estimation unit 12c (S102). The curve travel speed calculation unit 15b calculates the curve travel speed for the vehicle M to autonomously travelling within the travelling lane on the curved road having the acquired curve radius based on the acquired curve radius and error in longitudinal position (S103).

The speed planning unit 15c determines whether or not the speed of the vehicle M is equal to or higher than the curve travel speed (S104). In a case where the speed of the vehicle M is equal to or higher than the curve travel speed (Yes in S104), the speed planning unit 15c determines whether or not the curve travel speed is lower than the preset reference speed (S105). In a case where the curve travel speed is lower than the preset reference speed (Yes in S105), the hands-on request unit 16 performs the hands-on request to switch the control of the vehicle M to the manual driving by the driver (S106). The speed planning unit 15c performs the speed planning to decelerate the vehicle M such that the current speed is maintained or the speed becomes the reference speed at the time of entering the curved road in front of the vehicle M (S107). The travel control unit 17 performs the control of the vehicle M based on the speed plan generated in S106 until the vehicle M reaches an entry point to the curved road (S108).

On the other hand, in a case where the curve travel speed is not lower than the preset reference speed (No in S105), the speed planning unit 15c performs the speed planning to decelerate the vehicle M such that the speed of the vehicle M becomes the curve travel speed at the time of entering the curved road in front of the vehicle M (S109). The travel control unit 17 performs the control of the vehicle M based on the speed plan generated in S109 until the vehicle M reaches the entry point to the curved road (S110).

In a case where the speed of the vehicle M is not equal to or higher than the curve travel speed (No in S104), the control for decelerating the vehicle M based on the error in longitudinal position and the curve travel speed is not performed. In this case, the vehicle control apparatus 100 causes the vehicle M to autonomously travel based on the above-described travel plan generated by the travel plan generation unit 15 without using the error in longitudinal position and the curve travel speed of the vehicle M.

The present embodiment is configured as described above, and the curve travel speed calculation unit 15b in the vehicle control apparatus 100 calculates the curve travel speed for autonomously travelling within the travelling lane on the curved road based on the curve radius of the curved road in front of the vehicle M and the estimated error in longitudinal position of the vehicle M. In addition, in a case where the estimated error in longitudinal position is large, the curve travel speed calculation unit 15b makes the curve travel speed be low compared to a case where the error in longitudinal position is small. The speed planning unit 15c performs the speed planning to decelerate the vehicle M to the curve travel speed in a case where the speed of the vehicle M is equal to or higher than the curve travel speed and the curve travel speed is equal to or higher than the preset reference speed. The travel control unit 17 controls the speed of the vehicle M based on the speed plan generated by the speed planning unit 15c. In this way, in a case where the error in longitudinal position estimated by the longitudinal position estimation unit 12b is large, the speed of the vehicle M becomes low compared to a case where the error is small. As described above, since the speed of the vehicle M is controlled according to the error in longitudinal position, even in a case where there is an error in the estimated longitudinal position of the vehicle M, it is possible to control the speed at the time of entering the curved road such that the vehicle M can be caused to autonomously travel within the travelling lane on the curved road.

In a case where the curve travel speed is lower than the preset reference speed, the hands-on request unit 16 performs the hands-on request and switches the driving state to the manual driving by the driver. That is, when the vehicle control apparatus 100 tries to control the travelling of the vehicle M, the control is performed to make the speed be lower than the reference speed because the estimated error in longitudinal position is large. However, in this case, by switching the driving state to the manual driving by the driver, it is possible for the driver to drive the vehicle M along the curved road at an appropriate speed. In this way, the vehicle M travels at the speed lower than the reference speed, and thus, it is possible to suppress the interference with the travelling of a following vehicle. In addition, in a case where the curve travel speed is lower than the preset reference speed, by maintaining the speed of the vehicle M, since the state of the vehicle M does not change (the speed is constant) until the hands-on is performed, the driver can easily perform the hands-on. Alternatively, in a case where the curve travel speed is lower than the preset reference speed, by decelerating the vehicle M down to the reference speed, the state of the vehicle M slowly changes, and thus, the driver can easily perform the hands-on.

The hands-on request unit 16 calculates the reference distance based on the reference time preset as a time it takes for switching the driving state of the vehicle M from the autonomous driving state to the manual driving state. The hands-on request unit 16 performs the hands-on request at the position before the curved road in front of the vehicle M as much as the reference distance. In this case, since the hands-on request is performed at the position before the vehicle M entering the curved road as much as the reference distance, it is possible to secure the reference time preset as a time for the driver to perform the hands-on.

As described above, the embodiment of the present disclosure is described. However, the present disclosure is not limited to the embodiment described above. For example, the hands-on request unit 16 is configured to perform the hands-on request at the position before the curved road in font of the vehicle M as much as the reference distance. However, reference other than the reference distance may be used as the timing for performing the hands-on request. In addition, the method of calculating the reference distance is not limited to the above-described method using the reference time and the current speed of the vehicle M.

The vehicle control apparatus 100 generates the travel plan and performs the autonomous driving control of the vehicle M. However, the vehicle control apparatus 100 may perform a combination of a lane keep control in which the control is performed such that the vehicle M travels in the travelling lane and a speed management control in which the vehicle speed is controlled according to the shape of the travelling lane or the like. Even in a case where the vehicle control apparatus 100 performs the lane keep control and the speed management control instead of the autonomous driving control using the travel plan, the deceleration control of the vehicle M using the above-described error in longitudinal position and the curve travel speed can be performed.

What is claimed is:

1. A vehicle control apparatus configured to cause a vehicle to autonomously travel, comprising:
   a longitudinal position collation unit configured to recognize a longitudinal position which is a position of the vehicle in an extending direction of a travelling road in which the vehicle travels, based on image information from a camera and position information of a landmark on a map;
   a longitudinal position estimation unit configured to estimate the longitudinal position based on a result of detection by an internal sensor that detects a state of the vehicle and a result of recognition by the longitudinal position collation unit;
   an error estimation unit configured to estimate an error in longitudinal position estimated by the longitudinal position estimation unit, based on accuracy of detection by the internal sensor;
   a radius acquisition unit configured to acquire a curve radius of a curved road in front of the vehicle using the estimated longitudinal position and the map information;
   a curve travel speed calculation unit configured to calculate a curve travel speed for the vehicle to autonomously travel in a travelling lane on the curved road having the acquired curve radius based on the acquired curve radius and the estimated error in longitudinal position;
   a speed control unit configured to decelerate the vehicle such that vehicle speed becomes the curve travel speed at the time of entering the curved road in front of the vehicle in a case where the vehicle speed is equal to or higher than the curve travel speed and the curve travel speed is equal to or higher than a preset reference speed, and configured to decelerate the vehicle such that the current speed is maintained or the vehicle speed becomes the reference speed at the time of entering the curved road in front of the vehicle in a case where the vehicle speed is equal to or higher than the curve travel speed and the curve travel speed is lower than the reference speed; and
   a request unit configured to perform a hands-on request to switch a control of the vehicle to a manual driving by a driver in a case where the vehicle speed is equal to or higher than the curve travel speed and the curve travel speed is lower than the reference speed,
   wherein, the curve travel speed calculation unit is configured to make the curve travel speed be low in a case where the curve radius is short compared to a case where the curve radius is long, and configured to make the curve travel speed be low in a case where the error in longitudinal position is large compared to a case where the error in longitudinal position is small.

2. The vehicle control apparatus according to claim 1, wherein the request unit is configured to calculate a reference distance which is a travel distance in a case of travelling during reference time at the current speed of the vehicle based on the reference time preset as a time for switching a driving state of the vehicle to a manual driving state from an autonomous driving state and the current speed of the vehicle, and configured to perform the hands-on request at the position before the curved road in front of the vehicle as much as the reference distance.

* * * * *

UNITED STATES PATENT AND TRADEMARK OFFICE
CERTIFICATE OF CORRECTION

PATENT NO. : 10,310,508 B2
APPLICATION NO. : 15/680838
DATED : June 4, 2019
INVENTOR(S) : Akiomi Kunisa et al.

Page 1 of 1

It is certified that error appears in the above-identified patent and that said Letters Patent is hereby corrected as shown below:

In the Drawings

Sheet 4, figure 4, block S107, delete "Maintaine" and insert --Maintain--, therefor.

In the Specification

In Column 11, Line 56, after "performs", delete "is".

In Column 15, Line 21, delete "font" and insert --front--, therefor.

Signed and Sealed this
Sixteenth Day of July, 2019

Andrei Iancu
*Director of the United States Patent and Trademark Office*